(12) United States Patent
Cambon

(10) Patent No.: US 12,109,846 B2
(45) Date of Patent: Oct. 8, 2024

(54) TIRE MADE CONDUCTIVE BY ARRANGING A LOCALIZED CONDUCTIVE STRIP

(71) Applicant: Compagnie Generale des Etablissements Michelin, Clermont-Ferrand (FR)

(72) Inventor: Stéphanie Cambon, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 785 days.

(21) Appl. No.: 16/470,147

(22) PCT Filed: Dec. 14, 2017

(86) PCT No.: PCT/FR2017/053562
§ 371 (c)(1),
(2) Date: Jun. 14, 2019

(87) PCT Pub. No.: WO2018/109394
PCT Pub. Date: Jun. 21, 2018

(65) Prior Publication Data
US 2019/0359012 A1 Nov. 28, 2019

(30) Foreign Application Priority Data
Dec. 16, 2016 (FR) ........................................ 1662620

(51) Int. Cl.
*B60C 19/08* (2006.01)
*B60C 9/20* (2006.01)
(Continued)

(52) U.S. Cl.
CPC .............. *B60C 19/082* (2013.01); *B60C 9/22* (2013.01); *B60C 11/00* (2013.01); *B60C 19/08* (2013.01);
(Continued)

(58) Field of Classification Search
CPC ..... B60C 19/082; B60C 19/08; B60C 19/084; B60C 19/086; B60C 19/088; B29D 2030/526; Y10S 152/02
(Continued)

(56) References Cited

U.S. PATENT DOCUMENTS 2,329,332 A * 9/1943 Bull ........................ B60C 19/08
152/152.1
2,339,546 A * 1/1944 Hanson ................... B60C 19/08
152/152.1
(Continued)

FOREIGN PATENT DOCUMENTS

EP 0501227 A1 9/1992
EP 0 658 452 A1 * 6/1995
(Continued)

OTHER PUBLICATIONS

International Search Report dated Feb. 22, 2018, in corresponding PCT/FR2017/053562 (6 pages).

*Primary Examiner* — Adrienne C. Johnstone
(74) *Attorney, Agent, or Firm* — VENABLE LLP

(57) ABSTRACT

A tire comprises a crown zone comprising a crown reinforcement surmounted radially on the outside by a tread formed from at least one material that is not a conductor of electricity, the crown reinforcement comprising a plurality of layers superposed on one another, each layer of the crown reinforcement comprising two ends in the circumferential direction, these two ends being joined together in an abutment region, the tread comprising a weld region circumferentially offset by an angle of 180 degrees with respect to the region at which the radially outermost layer of the crown reinforcement is superposed. The tire comprises at least one conducting strip positioned between the tread and the crown reinforcement and located circumferentially as to be positioned at equal angular distances between the tread weld (Continued)

region and the region at which the radially outermost reinforcing layer is butted together, these two regions being diametrically opposite.

7 Claims, 1 Drawing Sheet

(51) Int. Cl.
*B60C 9/22* (2006.01)
*B60C 11/00* (2006.01)
*B29D 30/06* (2006.01)
*B29D 30/52* (2006.01)

(52) U.S. Cl.
CPC .......... B60C 19/086 (2013.01); B60C 19/088 (2013.01); *B29D 2030/0665* (2013.01); *B29D 2030/526* (2013.01); *B60C 2009/2045* (2013.01); *B60C 2200/06* (2013.01)

(58) Field of Classification Search
USPC ........................................................ 152/531
See application file for complete search history.

(56) References Cited

U.S. PATENT DOCUMENTS

| | | | | |
|---|---|---|---|---|
| 3,850,219 | A * | 11/1974 | Snyder | .............. B60C 9/22 152/531 |
| 4,262,726 | A * | 4/1981 | Welter | .............. B60C 9/22 152/531 X |
| 4,269,646 | A * | 5/1981 | Miller | .............. B60C 9/22 152/531 |
| 4,284,117 | A * | 8/1981 | Poque | .............. B60C 9/22 152/531 X |
| 5,227,425 | A | 7/1993 | Rauline | |
| 2004/0020583 | A1 * | 2/2004 | Zhu | .............. G01M 17/02 156/110.1 |
| 2006/0102264 | A1 | 5/2006 | Nicolas | |
| 2011/0259489 | A1 | 10/2011 | Queraud et al. | |
| 2014/0174612 | A1 | 6/2014 | Yoshikawa | |

FOREIGN PATENT DOCUMENTS

| | | |
|---|---|---|
| EP | 1659005 A1 | 5/2006 |
| JP | 2009-154608 A | 7/2009 |
| WO | 2009/127323 A1 | 10/2009 |

* cited by examiner

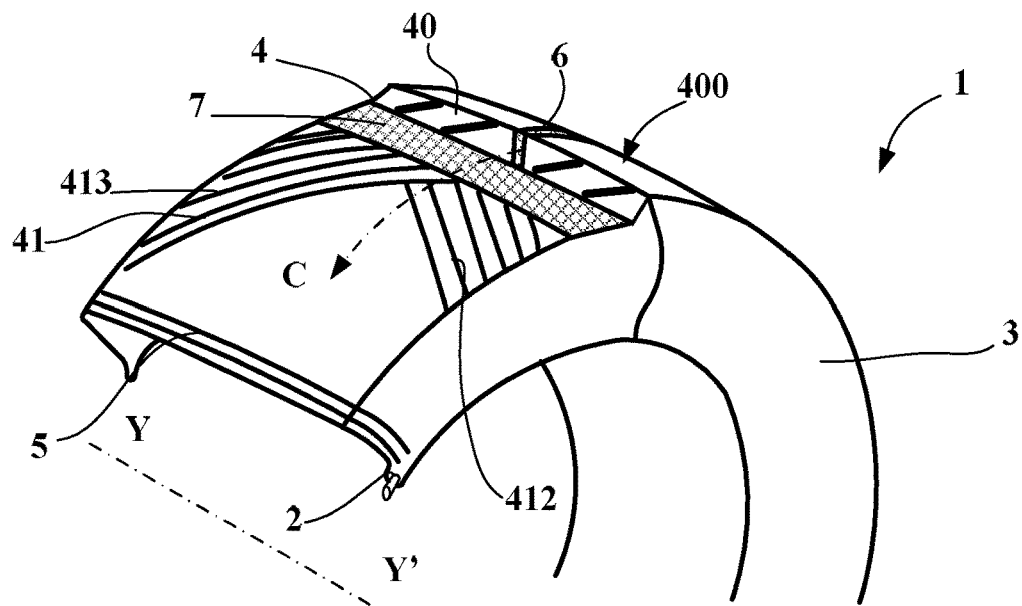
FIG.1
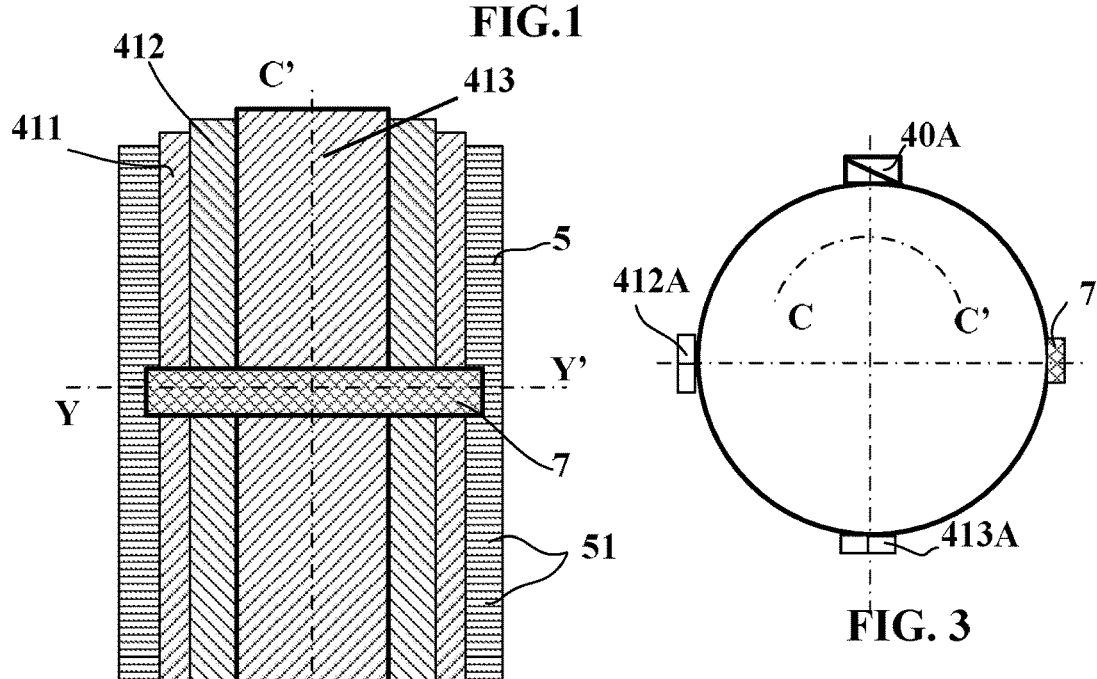
FIG.2
FIG. 3
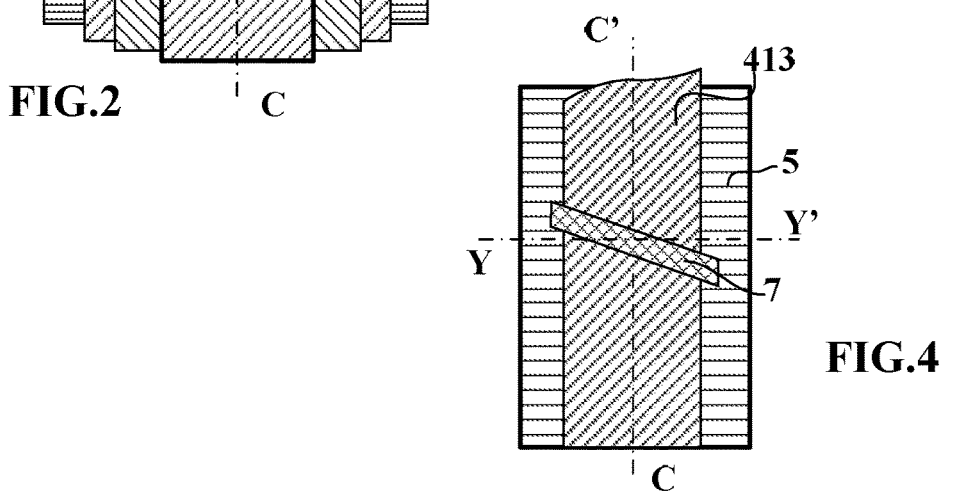
FIG.4

TIRE MADE CONDUCTIVE BY ARRANGING A LOCALIZED CONDUCTIVE STRIP

FIELD OF THE INVENTION

The field of the invention is tyres intended to be mounted on transport vehicles of the heavy duty type. More specifically, the invention deals with the problem of the flow and elimination of electric charges stored up in the tyres, these tyres containing elastomeric materials which are very poor conductors of electricity.

PRIOR ART

Definitions:

Within the context of this application, what should be understood by a material that is a very poor conductor of electricity is a material that has a resistivity greater than or equal to $10^8$ Ohms/cm. Likewise, what should be understood by a material that is a conductor of electricity is a material that has a resistivity of less than $10^6$ Ohms/cm. These materials have suitable elastic properties.

In the present description, the terms radial or radially are used to indicate a direction which, when considered on the tyre, is a direction perpendicular to the axis of rotation of the tyre whereas, when considered on a tread alone, it corresponds to the direction of the thickness of the said tread.

Moreover, the term circumferential is used to indicate a direction which corresponds to a direction tangential to any circle centred on the axis of rotation of the tyre. This same direction corresponds to the longitudinal direction of the tread, the latter being formed in the manner of a flat strip before it is incorporated at the time of manufacture of a tyre.

A tyre is made up of a crown connected by sidewalls to beads, these beads being intended to be in contact with a mounting rim. The tyre within its structure comprises a carcass reinforcement formed of a plurality of reinforcers extending from one bead to the other and reinforcing the sidewalls and the crown. Furthermore, the crown of the tyre comprises a crown reinforcement which is surmounted radially on the outside by a tread intended to come into contact with the road and to become worn as the tyre runs.

The crown reinforcement may be formed of a plurality of layers of elastomeric material, each layer being reinforced with reinforcers such as cords of various natures: metallic, textile. A tyre is usually built by superposing the various layers each of which forms one element of the structure of the tyre, each layer being wound in the circumferential direction and having ends. These ends may be laid end-to-end or superposed on one another to form an abutting region.

The same is true of the carcass reinforcement which extends from one bead to the other. This carcass reinforcement comprises a plurality of reinforcers arranged in such a way that each reinforcer is contained in a radial plane (plane containing the axis of rotation). This carcass reinforcement during the manufacture is laid on a cylinder, the carcass reinforcers being oriented parallel to the axis of the cylinder. This reinforcement comprises two ends in the circumferential direction on this tyre building cylinder, the mechanical integrity of the reinforcement being achieved by superposing these two ends over a few reinforcers.

The cohesion of all the component parts and layers is obtained by a final operation of moulding and vulcanizing the elastomeric materials, which operation is performed in a mould. This mould gives the tyre an external appearance that comprises, in addition to the markings, a tread pattern design on its tread.

With a view to lowering the rolling resistance of the tyres and therefore reducing the fuel consumption of the vehicles, the elastomeric materials of which the tyres are made are selected from low hysteresis elastomeric materials that limit energy losses during the loading cycles resulting from running. These low hysteresis materials either have a low content of carbon black fillers or are materials which, by way of predominant filler, comprise fillers that are not electrically conducting, such as silica. The impact of these features is to very appreciably reduce the conduction of electric charges, which may accumulate in the tyre accompanied by all the disadvantages that may cause.

The use of materials with low hysteresis losses has been widely developed for the creation of treads given the advantages afforded by such materials in also improving the following performance aspects: grip on dry ground or on ground that is wet or icy, resistance to wear, running noise. A tyre of this type is described by way of illustration in European patent EP 0501227 B1.

However, the use of these compounds generates a problem associated with the buildup of static electricity during running of the vehicle as there is no flow path leading the charge that has accumulated in the tyre towards the roadway. This absence of a path is a result of the very high resistivity of the materials of which the tread is made. The static electricity that is thus accumulated in a tyre is liable, when certain particular conditions are simultaneously present, to result in the occupant of the vehicle experiencing an electric shock when this occupant touches the bodywork of the vehicle. This static electricity is also liable to accelerate the ageing of the tyre because of the presence of ozone generated by the electric discharge. Depending on the nature of the roadway and of the vehicle, static electricity that has not been removed may also cause malfunctioning of the electronic devices on board the vehicle, because of the interference generated.

This problem has attracted special attention and a great deal of work has led to various solutions to allow electric charge to flow from the tyre towards the roadway.

One solution is notably explained in patent EP 0658452 B1 and whereby at least one insert of conductive material is added preferably to the entire circumference of the tyre and within the thickness of the tread, this insert connecting the external surface of the tread either to the crown reinforcement or to the carcass reinforcement or to any other sufficiently electrically conducting part adjacent to the tread.

According to this solution, the external surface of the tread is connected to a part of the tyre which is immediately adjacent to it and conducting, such as the sidewall, the crown reinforcement reinforcer or the carcass reinforcement. The electric charge is removed to the ground from the rim, the latter being connected to the vehicle, and passes through the beads which are in contact with the rim, then follows a path through the sidewalls through the materials that make up the carcass reinforcing ply or the rubbers that protect the sidewalls towards an internal part of the crown zone, and finally flows from the internal part of the crown zone towards the ground through the crown reinforcement and through the tread.

Document EP1659005 B1 describes various alternative forms of solution that can be applied to this type of tyre by using a narrow conducting strip that creates a conducting path between a bead and a conducting insert in the tread. It has been found that this last solution is entirely effective in solving the problem associated with the buildup of electric charge in the tyre. However, the addition of this narrow conducting strip creates unevenness in the thickness of the tyre leading to nonuniformity of the tyre, it being possible for this nonuniformity to cause the tyre to develop abnormal or uneven wear. What is meant by nonuniformity is an unevenness as the wheel turns, which may generate a local variation in thickness, in width, in stiffness which, under running conditions, results in vibrations. What is meant by uneven wear is wear that has a tendency to be greater in certain regions of the tread compared with the other regions. This uneven wear is also a contributory factor to vibrations during running and may lead to the tyre being withdrawn from service early. Even wear is defined as wear which uniformly affects the entire width of a tread and does so over the entire circumference thereof. This is the type of wear sought for the tyres of heavy duty vehicles, rather than uneven wear.

The tyres of heavy duty vehicles are particularly sensitive to their manufacturing quality and uniformity criteria such as static imbalance and out-of-roundness are very tightly controlled. Asymmetry in the distribution of weight in a tyre, connected with the buildup of several welds of its components in the one same region, creates an unbalanced effect of the imbalance type which has the potential to cause abnormal or uneven wear. The existence of welded regions or of superposition regions of the ends of the components generates vibrations which, it has been found, are also connected with the onset of uneven wear.

The present invention seeks to solve this problem which may occur when adding a localized conducting strip used to conduct electric charge that is unable to flow from the vehicle towards the roadway because of the use of materials that are particularly poor conductors of electricity.

The invention described here thus proposes an improvement to the architecture proposed in EP1659005 B1, reducing the risk of uneven wear associated with the presence of at least one conducting strip extending in at least one sidewall.

BRIEF DESCRIPTION OF THE INVENTION

The tyre according to the invention is intended to be mounted on a wheel and comprises:
- a crown zone comprising a crown reinforcement surmounted radially on the outside by a tread, this tread having an external surface, referred to as the tread surface, intended to come into contact with the roadway, this tread being formed from at least one material that is not a conductor of electricity and comprising conducting means in order to conduct electricity throughout the thickness of the tread, the crown reinforcement comprising a plurality of layers superposed on one another,
- two beads intended to provide contact between the wheel and the tyre, the part of the beads that is in contact with the wheel being a conductor of electricity
- sidewalls intended to provide the connection between the crown zone and the beads.

The carcass reinforcement is wound around an axis and its ends are joined together so as to ensure good mechanical integrity. This connecting region creates a discontinuity which may disturb the uniformity of the tread wear.

Each layer of the crown reinforcement is wound and comprises two ends in the circumferential direction, these two ends being joined together in an abutting region by butting them against one another to ensure good mechanical integrity following vulcanization.

The tread is wound and comprises two ends in the circumferential direction, these two ends being mechanically joined together by an oblique weld region formed in the thickness of the tread.

This tread weld region is circumferentially offset by an angle of 180 degrees with respect to the region at which the ends of the radially outermost layer of the crown reinforcement are butted together.

The tread comprises at least one conducting means extending throughout the thickness of the tread from the tread surface of the tread.

Furthermore, the tyre comprises at least one conducting strip of small thickness (i.e. at most 2 mm) and of small width made from a material of a rubbery nature that is a conductor of electricity and positioned between the tread and the crown reinforcement over at least part of the width of the crown reinforcement, for example, axially coextensive with the width of the crown reinforcement, so as to create a flow path for electric charge to follow between the conducting means formed in the tread and at least either one of the sidewalls or one of the beads.

This tyre is such that this conducting strip is circumferentially located in such a way as to be positioned at equal angular distances between the tread weld region and the region at which the radially outermost reinforcing layer is butted together, these two regions being diametrically opposite.

This arrangement effectively makes it possible to minimize the impact that the presence of the conducting strip has on the uniformity of the tyre and thus to avoid the generation of uneven tread wear.

For preference, the conducting strip has a thickness at most equal to 1 mm.

In another preferred embodiment, the electrically conducting strip is positioned in such a way as to be oriented radially and to extend across the entire width of the crown reinforcement.

In another alternative form, the conducting strip is positioned obliquely on either side of a circumferential position equidistant from the tread weld regions and the superposition zone of the radially outermost reinforcing layer, the purpose of that being to limit the impact that the presence of this strip has in the contact patch in which the tread is in contact with the roadway. The angle at which the conducting strip is oriented is at most equal to 20 degrees.

In another preferred embodiment, the sidewalls intended to provide the connection between the crown zone and the beads are not conducting. In such instances, the conducting strip is extended into at least one of the sidewalls to meet the bead parts and thus provide a path for electric charge between the rim and the roadway.

In another advantageous alternative form of embodiment of the invention, the weld region of the penultimate layer of the carcass reinforcement is angularly positioned in such a way as to be situated diametrically opposite the conducting strip.

A conducting means passing through the tread may consist of at least one insert made of rubbery material, this insert having enough thickness to conduct electric charge between the ground and the conducting strip.

In another alternative form, the crown reinforcement comprises at least one layer of hoop reinforcers oriented in the circumferential direction or in a direction close to the circumferential direction, namely at an angle at most equal to 10 degrees to the circumferential direction, the presence of this hoop layer having the effect of limiting the expansion of the crown of the tyre in the radial direction as the tyre rotates and thus of reducing nonuniformities that could be linked to the presence of a narrow conducting strip.

Further features and advantages of the invention will become apparent from the following description given with reference to the appended drawing which shows, by way of nonlimiting example, several embodiments of the subject matter of the invention.

BRIEF DESCRIPTION OF THE FIGURES

FIG. 1 depicts a partial view of a tyre according to the invention, in which the sidewalls of the tyre are conducting;

FIG. 2 and FIG. 4 show local views of the crown of the tyre of FIG. 1, showing alternative positioning of the conducting strip;

FIG. 3 depicts a side view of the tyre of FIG. 1, schematically showing the positions of the welds of the main reinforcing layers, of the tread, and the position of the conducting band.

DETAILED DESCRIPTION

FIG. 1 shows a partial view of a tyre 1 of size 315/70R22.5 according to the invention. This tyre 1 comprises beads 2 intended to come into contact with a mounting rim (not depicted), these beads 2 being extended by electrically conducting sidewalls 3, these sidewalls 3 being connected to a crown 4. This tyre 1 comprises a carcass reinforcement 5 extending from bead to bead.

The crown 4 of the tyre formed radially on the outside of the carcass reinforcement 5 comprises a crown reinforcement 41 comprising two layers of reinforcers referred to as working layers 411, 412, these working layers being surmounted by a protective layer 413. Finally, the crown reinforcement 41 is capped radially on the outside by a tread 40 intended to come into contact with a roadway via its tread surface 400.

In the example described, the rubbery materials that make up the crown reinforcement 41 and the carcass reinforcement 5 are not conductors of electricity. Furthermore, the tread 40 is likewise made from a material which is a poor or non-conductor, and the reinforcing filler of which is predominantly silica.

During tyre building, each working layer 411, 412 and protective layer 413 is laid by winding in the circumferential direction. Each working and protective layer comprises two ends that are butted one against the other or by laying them end-to-end to provide good mechanical integrity. If the region of superposition of the first working layer 411 is taken as an angular reference point, then the region of superposition of the second working layer 412 is offset from this angular reference by 90 degrees while the last layer 413 (the protective layer) is positioned in such a way as to be diametrically opposite this same reference.

The tread 40, which has a thickness E equal, in this instance, to 15 mm, comprises two ends chamfered at a mean angle of 35 degrees; these ends are intended to be placed one against the other in order to create a good mechanical connection. This superposition of the chamfered ends is located opposite the region of superposition of the last layer 413 of the crown reinforcement.

In the case presented here, the sidewalls as well as the materials of the bead are conducting.

In order to provide a flow path for charge in the tread 40, a conducting insert 6 is moulded into the tread and passes through the entire thickness of the tread between its tread surface 400 and its radially innermost surface.

In order to create an electric conduction path between the mounting rim and the roadway on which the tyre is running, a conducting strip 7 made from a conducting material is positioned radially on the outside of the last protective layer 413 of the crown reinforcement and across the entire axial width of this crown reinforcement, this conducting strip 7 having a thickness of 1 mm and a width of 25 mm. In FIG. 1, the axial width of the conducting strip 7 is depicted as being coextensive with the axial extent of the crown reinforcement 41.

FIG. 2 depicts, in plan view, the conducting strip 7 which covers the entire width of the protective layer 413 so as to be in contact with the conducting sidewalls. In this example, the conducting strip 7 follows a path which can be qualified as radial because its longest edges are parallel to the reinforcers of the carcass reinforcement 5, which in this instance is radial.

FIG. 3 depicts a side view of the tyre of FIG. 1, showing the positions of the connecting regions 412A, 413A, 40A for the main reinforcing layers and the tread, respectively, also the position of the conducting band 7.

The conducting strip is placed in an angular sector 90 degrees away from the weld of the tread 40 and away from the weld region of the last protective layer 413 of the crown reinforcement 41 and lies diametrically opposite the second working layer 412. The region at which the ends of the first working layer 411 are butted together is located at the same angular reference as the tread weld region 40A.

In another alternative form shown in FIG. 4, the conducting strip 7 is positioned in such a way as to have its long edges not aligned with the radial reinforcers of the carcass reinforcement 5. The angle at which the conducting strip 7 is laid is, here, of the order of 15 degrees (angle measured with respect to the transverse or axial direction).

In an alternative form of the invention, the sidewalls are not conducting. In that case, the conducting strip 7 is extended into the sidewalls 3 to provide continuity between the conducting insert 6 formed in the tread and the materials of the beads in contact with the rim.

The invention claimed is:

1. A tire intended to be mounted on a wheel and to bear a load, the tire comprising:
 a crown zone comprising a crown reinforcement surmounted radially on the outside by a tread, the tread having an external tread surface intended to come into contact with a roadway, the tread being formed from at least one material that is not a conductor of electricity and further comprising a conducting insert molded into the tread over its entire circumference, thus forming an integral part of the tread, the conducting insert passing through the entire thickness of the tread at the equatorial plane of the tread between the tread surface and a radially innermost surface of the tread, and the crown reinforcement comprising a plurality of layers superposed on one another;
 two beads intended to provide contact between the wheel and the tire, a part of the beads that is intended to be in contact with the wheel being a conductor of electricity;
 sidewalls providing a connection between the crown zone and the beads, the sidewalls being a conductor of electricity; and
 at least one conducting strip of a thickness at most equal to 2 mm made from a material of rubbery nature which is a conductor of electricity and positioned between the tread and the crown reinforcement, each strip having an axial width that is at most coextensive with the axial extent of the crown reinforcement so as to create a flow path for electric charge between the conducting insert molded into the tread and the beads via the sidewalls, wherein each layer of the crown reinforcement is wound and comprises two ends in the circumferential direction, the two ends being joined together in an abutment region, wherein the tread is wound and comprises two ends in the circumferential direction, the two ends being mechanically joined together by an oblique weld region formed in the thickness of the tread, the tread weld region being circumferentially offset by an angle of 180 degrees with respect to the region at which the radially outermost layer of the crown reinforcement is butted together, wherein one of the at least one conducting strip is circumferentially located in such a way as to be positioned at equal angular distances between the tread weld region and the region at which the radially outermost crown reinforcing layer is butted together, the tread weld region and the region at which the radially outermost crown reinforcing layer is butted together being diametrically opposite, and wherein the at least one conducting strip has a circumferential width equal to at most twice the circumferential width of the tread weld region.

2. The tire according to claim 1, wherein the at least one conducting strip has a thickness at most equal to 1 mm.

3. The tire according to claim 1, wherein the at least one conducting strip is positioned in such a way as to be oriented radially across an entire width of the crown reinforcement so that the axial width of each strip is coextensive with the axial extent of the crown reinforcement.

4. The tire according to claim 1, wherein the at least one conducting strip is oriented at an angle to the axial direction.

5. The tire according to claim 4, wherein the angle at which the at least one conducting strip is oriented is at most equal to 20 degrees.

6. The tire according to claim 1, wherein the region at which the penultimate radially outer layer of the crown reinforcement butted together is angularly positioned so as to be situated diametrically opposite one of the at least one conducting strip.

7. The tire according to claim 1, wherein the crown reinforcement comprises at least one layer of hoop reinforcers oriented in the circumferential direction or at an angle at most equal to 10 degrees to the circumferential direction, and a presence of the at least one layer of hoop reinforcers has an effect of limiting expansion of the crown in the radial direction as the tire rotates and of reducing nonuniformities.

* * * * *